United States Patent
Van Heuklon et al.

(10) Patent No.: US 11,366,651 B2
(45) Date of Patent: Jun. 21, 2022

(54) FRAMEWORK FOR HARDWARE-SPECIFIC ANALYTIC PLUGINS

(71) Applicant: LENOVO Enterprise Solutions (Singapore) PTE. LTD., New Tech Park (SG)

(72) Inventors: Jeffery Van Heuklon, Rochester, MN (US); Alexandru Cozma, Bucharest (RO)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/836,281

(22) Filed: Mar. 31, 2020

(65) Prior Publication Data

US 2021/0303286 A1    Sep. 30, 2021

(51) Int. Cl.
*G06F 9/44*    (2018.01)
*G06F 9/455*    (2018.01)
(Continued)

(52) U.S. Cl.
CPC ........... *G06F 8/61* (2013.01); *G06F 11/3058* (2013.01); *H04L 43/08* (2013.01)

(58) Field of Classification Search
CPC ........ G06F 8/61; G06F 11/3058; H04L 43/08; H04L 41/14
See application file for complete search history.

(56) References Cited

U.S. PATENT DOCUMENTS 8,826,287 B1 *  9/2014  Graupner ............... G06F 9/5061
                                                        709/224
9,985,850 B2 *  5/2018  Qureshi ................... H04W 4/50
(Continued)

FOREIGN PATENT DOCUMENTS

WO    WO-2018022585 A1 *  2/2018  ............. H04L 67/12

OTHER PUBLICATIONS

Salman Taherizadeh, Monitoring self-adaptive applications within edge computing frameworks: A state-of-the-art review, 2017, pp. 1-20. https://www.sciencedirect.com/science/article/pii/S016412121730256X (Year: 2017).*
(Continued)

*Primary Examiner* — Mongbao Nguyen
(74) *Attorney, Agent, or Firm* — Kunzler Bean & Adamson; Bruce R. Needham (57) ABSTRACT

A method for installing and using hardware specific plugins to a monitoring application includes installing, by use of a processor, a hardware specific plugin to a monitoring application that monitors health of a monitored computing system. The plugin corresponds to a hardware device of the monitored computing system monitored by the monitoring application. The plugin includes analytics rules corresponding to hardware parameters monitored within the hardware device and received by a server comprising the processor and running the monitoring application. The method includes receiving, by use of a processor, data corresponding to the hardware parameters of the hardware device, applying, by use of a processor, the analytics rules of the plugin to the received data of the monitored hardware parameters of the hardware device, and sending, by use of a processor, an alert in response to determining that the received data violates an analytics rule of the plugin.

17 Claims, 7 Drawing Sheets

(51) Int. Cl.
*G06F 9/445* (2018.01)
*G06F 8/61* (2018.01)
*H04L 43/08* (2022.01)
*G06F 11/30* (2006.01)

(56) References Cited

U.S. PATENT DOCUMENTS

| | | | | |
|---|---|---|---|---|
| 2013/0131840 A1* | 5/2013 | Govindaraj | ...... | G05B 19/41865 700/19 |
| 2013/0232331 A1* | 9/2013 | Farhan | ...... | G06F 11/328 713/100 |
| 2015/0163121 A1* | 6/2015 | Mahaffey | ...... | H04L 63/1425 707/687 |
| 2015/0358391 A1* | 12/2015 | Moon | ...... | G06F 11/34 709/224 |
| 2016/0147539 A1* | 5/2016 | Farhan | ...... | G06F 11/3006 713/100 |
| 2016/0224382 A1* | 8/2016 | Farhan | ...... | G06F 9/5044 |
| 2017/0102694 A1* | 4/2017 | Enver | ...... | G05B 19/4184 |
| 2017/0185502 A1* | 6/2017 | Iyer | ...... | G06F 11/3051 |
| 2017/0230487 A1* | 8/2017 | Cameron | ...... | H04L 69/18 |
| 2018/0302272 A1* | 10/2018 | Makovsky | ...... | H04L 41/0681 |
| 2019/0376991 A1* | 12/2019 | Rudorfer | ...... | G01N 35/00871 |
| 2019/0379576 A1* | 12/2019 | Narnakaje Venugopala | ...... | H04L 41/142 |
| 2020/0007404 A1* | 1/2020 | Pinheiro | ...... | H04L 41/06 |
| 2020/0042324 A1* | 2/2020 | Ayolasomyajula | ...... | G06F 9/542 |
| 2020/0233692 A1* | 7/2020 | Kandula | ...... | G06F 8/65 |
| 2020/0364127 A1* | 11/2020 | White | ...... | H04L 41/5035 |
| 2020/0366572 A1* | 11/2020 | Chauhan | ...... | H04L 41/5032 |

OTHER PUBLICATIONS

Staff Contributor, Best System Monitoring Software in 2020, 2019, pp. 1-19. https://www.dnsstuff.com/system-monitoring-software (Year: 2019).*

Abhishek Dubey, Model-based Software Health Management for Real-Time Systems, 2011, pp. 1-18. https://www.isis.vanderbilt.edu/sites/default/files/Paper_6.pdf (Year: 2011).*

Salman Taherizadeh, Monitoring self-adaptive applications within edge computing frameworks: A state-of-the-art review, 2017, pp. 19-35. https://www.sciencedirect.com/science/article/pii/S016412121730256X (Year: 2017).*

Charith Perera, MOSDEN: An Internet of Things Middleware for Resource Constrained Mobile Devices, 2014, pp. 1053-1062. https://orca.cardiff.ac.uk/id/eprint/134059/1/06758734.pdf (Year: 2014).*

Berktold, et al., "CPU Monitoring with DTS/PECI", Intel Corporation, Sep. 2010, pp. 1-23.

* cited by examiner

FRAMEWORK FOR HARDWARE-SPECIFIC ANALYTIC PLUGINS

FIELD

The subject matter disclosed herein relates to remote monitoring and more particularly relates to using hardware specific plugins to a monitoring application for particular monitored hardware devices.

BACKGROUND

Computing systems of organizations are often large enough that a system administrator monitors the system, deploys software updates, etc. A management server is often used to monitor the system, either over a back channel management network or over a data network. Monitoring software typically either has to be modified for each newly added hardware component or the monitoring software needs to support a very wide variety of hardware devices, which increases the size and complexity of the monitoring software.

BRIEF SUMMARY

A method for installing and using hardware specific plugins to a monitoring application is disclosed. A computer program product and a computing device also perform the functions of the apparatus. The method includes installing, by use of a processor, a hardware specific plugin to a monitoring application that monitors health of a monitored computing system. The hardware specific plugin corresponds to a hardware device of the monitored computing system monitored by the monitoring application. The hardware specific plugin includes analytics rules corresponding to hardware parameters monitored within the hardware device and received by a server comprising the processor and running the monitoring application. The method includes receiving, by use of a processor, data corresponding to the hardware parameters of the hardware device, applying, by use of a processor, the analytics rules of the hardware specific plugin to the received data of the monitored hardware parameters of the hardware device, and sending, by use of a processor, an alert in response to determining that the received data violates an analytics rule of the hardware specific plugin.

A program product includes a computer readable storage medium and program code, where the program code is configured to be executable by a processor to perform operations. The operations include installing a hardware specific plugin to a monitoring application that monitors health of a monitored computing system. The hardware specific plugin corresponds to a hardware device of the monitored computing system monitored by the monitoring application and the hardware specific plugin includes analytics rules corresponding to hardware parameters monitored within the hardware device and received by a server comprising the processor and running the monitoring application. The operations include receiving data corresponding to the hardware parameters of the hardware device, applying the analytics rules of the hardware specific plugin to the received data of the monitored hardware parameters of the hardware device, and sending an alert in response to determining that the received data violates an analytics rule of the hardware specific plugin.

A computing device includes a processor and a memory that stores code executable by the processor. The code is executable by the processor to install a hardware specific plugin to a monitoring application that monitors health of a monitored computing system. The hardware specific plugin corresponds to a hardware device of the monitored computing system monitored by the monitoring application. The hardware specific plugin includes analytics rules corresponding to hardware parameters monitored within the hardware device and received by a server comprising the processor and running the monitoring application. The codes is executable by a processor to receive data corresponding to the hardware parameters of the hardware device, apply the analytics rules of the hardware specific plugin to the received data of the monitored hardware parameters of the hardware device, and send an alert in response to determining that the received data violates an analytics rule of the hardware specific plugin.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for installing and using hardware specific plugins to a monitoring application is disclosed. A computer program product and a computing device also perform the functions of the apparatus. The method includes installing, by use of a processor, a hardware specific plugin to a monitoring application that monitors health of a monitored computing system. The hardware specific plugin corresponds to a hardware device of the monitored computing system monitored by the monitoring application. The hardware specific plugin includes analytics rules corresponding to hardware parameters monitored within the hardware device and received by a server comprising the processor and running the monitoring application. The method includes receiving, by use of a processor, data corresponding to the hardware parameters of the hardware device, applying, by use of a processor, the analytics rules of the hardware specific plugin to the received data of the monitored hardware parameters of the hardware device, and sending, by use of a processor, an alert in response to determining that the received data violates an analytics rule of the hardware specific plugin.

In some embodiments, the method includes receiving input from a user to modify one or more parameters of an analytics rule associated with a monitored hardware parameter of the hardware device, where the analytics rule are available to the user via the installed hardware specific plugin. In other embodiments, the method includes modifying a user interface to include parameters associated with the analytics rules of the hardware specific plugin that correspond to the monitored hardware parameters of the hardware device. The user interface allows a user to view and modify parameters associated with analytics rules of hardware devices monitored by the monitoring application. In other embodiments, the analytics rules in the hardware specific plugin include one or more thresholds for the monitored hardware parameters of the hardware device and the user interface enables the user to view the one or more thresholds and to modify a threshold. In other embodiments, the user interface enables the user to manage alert options for an alert associated with an analytics rule of the hardware specific plugin.

In some embodiments, the method includes detecting a new connection to the hardware device. The connection enables receiving data corresponding to the monitored parameters of the hardware device, where installing the hardware specific plugin is in response to detecting the new connection to the hardware device. In other embodiments, the method includes detecting a new connection to a new hardware device that is the same as a previously connected hardware device, receiving data corresponding to the hardware parameters of the new hardware device, applying analytics rules of a hardware specific plugin previously installed for the previously connected hardware device to monitored hardware parameters of the new hardware device, where each monitored hardware parameter of the new hardware device includes an additional monitored hardware parameter for the monitoring application, and sending an alert in response to determining that the received data of the new hardware device violates an analytics rule of the hardware specific plugin.

In some embodiments, receiving data corresponding to the hardware parameters of the hardware device includes receiving the data over a network connection to the hardware device. In further embodiments, the network connection includes a management network connection different from a data network connecting components of the monitored computing system for workload processing. In other embodiments, the monitored hardware parameters include temperature data, hardware failure data, power usage data, and hardware usage data. In other embodiments, the hardware specific plugin includes an analytics rule for each monitored hardware parameter of the hardware device.

In some embodiments, applying the analytics rules of the hardware specific plugin to the received data of the monitored hardware parameters includes determining if a monitored hardware parameter exceeds a threshold and sending an alert includes sending an alert in response to the monitored hardware parameter exceeding the threshold, where the alert identifies the exceeded threshold. In other embodiments, the hardware specific plugin is an application data interface ("API") to the monitoring application. In other embodiments, the monitoring application runs on a virtual machine running on the server.

A program product includes a computer readable storage medium and program code, where the program code is configured to be executable by a processor to perform operations. The operations include installing a hardware specific plugin to a monitoring application that monitors health of a monitored computing system. The hardware specific plugin corresponds to a hardware device of the monitored computing system monitored by the monitoring application and the hardware specific plugin includes analytics rules corresponding to hardware parameters monitored within the hardware device and received by a server comprising the processor and running the monitoring application. The operations include receiving data corresponding to the hardware parameters of the hardware device, applying the analytics rules of the hardware specific plugin to the received data of the monitored hardware parameters of the hardware device, and sending an alert in response to determining that the received data violates an analytics rule of the hardware specific plugin.

In some embodiments, the code is further configured to be executable by the processor to perform operations that include receiving input from a user to modify one or more parameters of an analytics rule associated with a monitored hardware parameter of the hardware device, where the analytics rule are available to the user via the installed hardware specific plugin. In other embodiments, the code is further configured to be executable by the processor to perform operations comprising modifying a user interface to include parameters associated with the analytics rules of the hardware specific plugin that correspond to the monitored hardware parameters of the hardware device. The user interface allows a user to view and modify parameters associated with analytics rules of hardware devices monitored by the monitoring application. In other embodiments, the analytics rules in the hardware specific plugin include one or more thresholds for the monitored hardware parameters of the hardware device and the user interface enables the user to view the one or more thresholds and to modify a threshold.

In some embodiments, the code is further configured to be executable by the processor to perform operations that include detecting a new connection to a new hardware device that is the same as a previously connected hardware device, receiving data corresponding to the hardware parameters of the new hardware device, applying analytics rules of a hardware specific plugin previously installed for the previously connected hardware device to monitored hardware parameters of the new hardware device, where each monitored hardware parameter of the new hardware device includes an additional monitored hardware parameter for the monitoring application, and sending an alert in response to determining that the received data of the new hardware device violates an analytics rule of the hardware specific plugin.

A computing device includes a processor and a memory that stores code executable by the processor. The code is executable by the processor to install a hardware specific plugin to a monitoring application that monitors health of a monitored computing system. The hardware specific plugin corresponds to a hardware device of the monitored computing system monitored by the monitoring application. The hardware specific plugin includes analytics rules corresponding to hardware parameters monitored within the hardware device and received by a server comprising the processor and running the monitoring application. The codes is executable by a processor to receive data corresponding to the hardware parameters of the hardware device, apply the analytics rules of the hardware specific plugin to the received data of the monitored hardware parameters of the hardware device, and send an alert in response to determining that the received data violates an analytics rule of the hardware specific plugin.

Figure 1A:
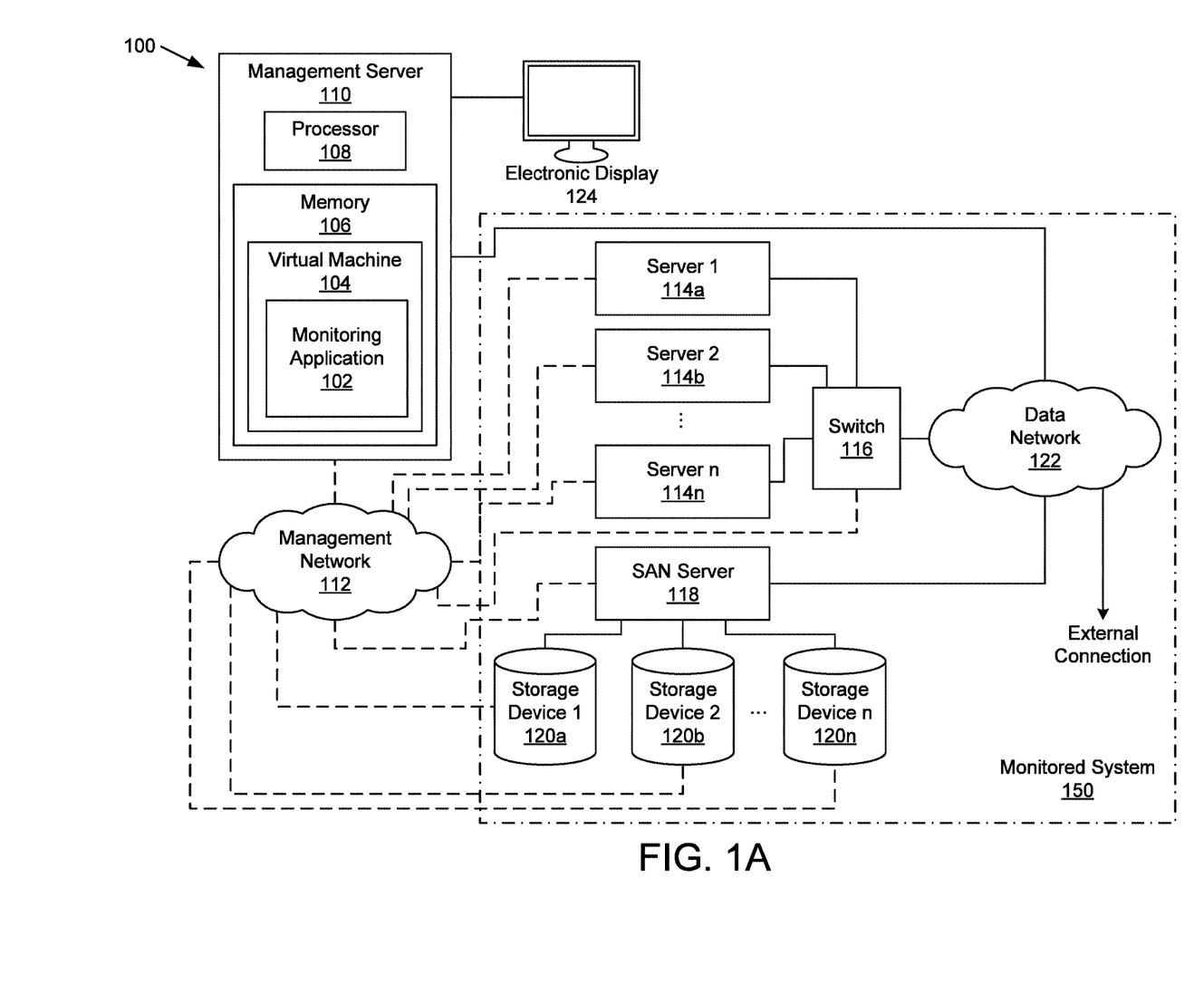
FIG. 1A is a schematic block diagram illustrating one embodiment of a system for a hardware specific plugin with a data network and a management network.

FIG. 1A is a schematic block diagram illustrating one embodiment of a system 100 for a hardware specific plugin with a data network 122 and a management network 112. The system 100 includes a monitoring application 102 running on a virtual machine 104 in memory 106 that executes on a processor 108 of a management server 110. In other embodiments, the monitoring application 102 is not on a virtual machine but instead is running on the operating system of the management server 110.

The management server 110 is connected through a management network 112 to a monitored system 150 that includes servers 114a, 114b, . . . 114n (collectively or generically "114"), a switch 116, a storage area network ("SAN") 118 connected to storage devices 120a, 120b, . . . 120n (collectively or generically "120"), and the like. The monitored system 150 may include any type of computing equipment capable of being monitored by a monitoring application 102. Typically, the monitored system 150 is connected to a data network 122, which may be different than the management network 112. In the embodiment, management commands, monitored data, etc. are transmitted over the management network 112 while data traffic is transmitted over the data network 122. The management network 112 may be a physically separate network or a virtually separate network.

Figure 1B:
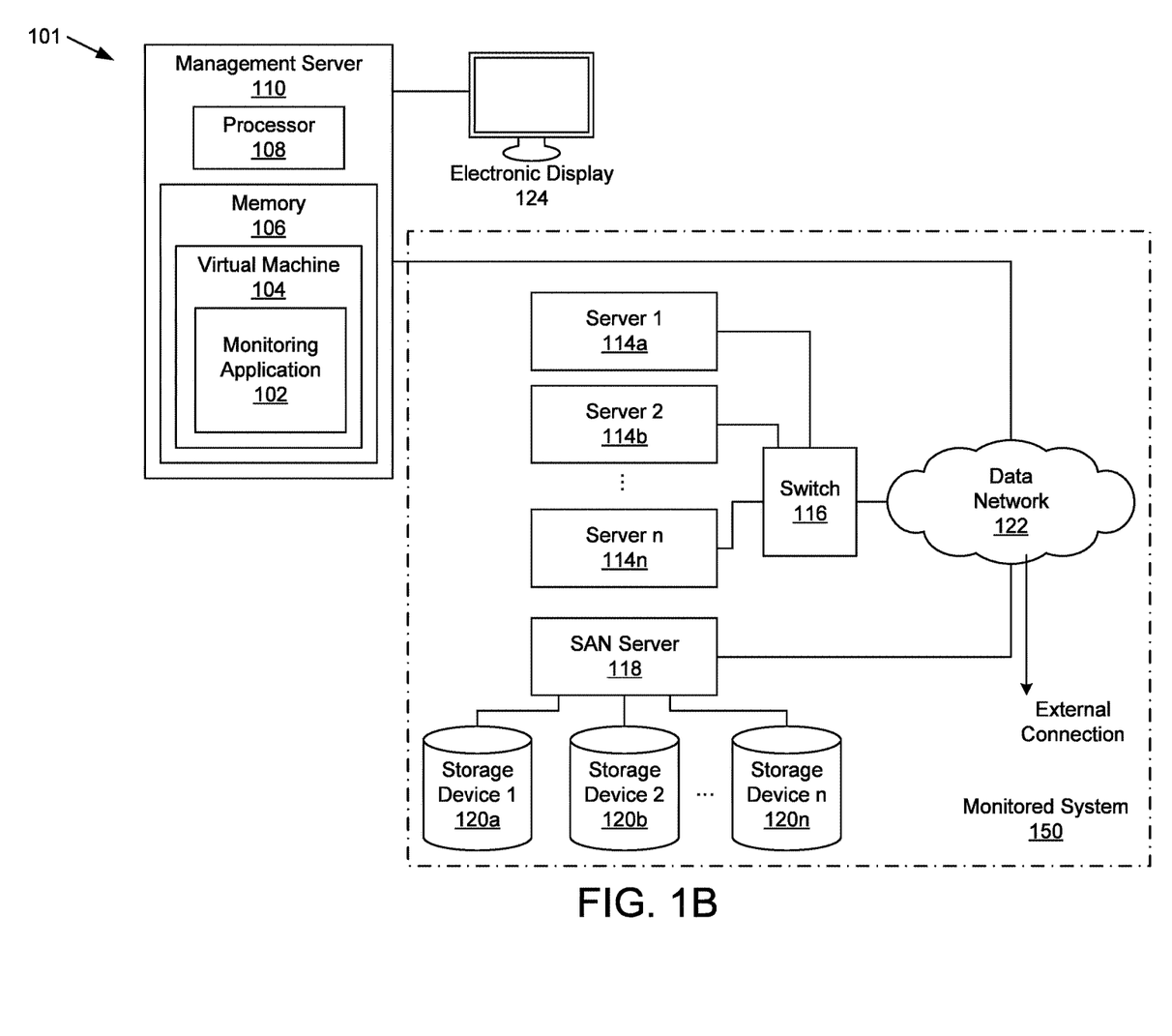
FIG. 1B is a schematic block diagram illustrating one embodiment of a system for a hardware specific plugin with a data network.

FIG. 1B is a schematic block diagram illustrating one embodiment of a system 101 for a hardware specific plugin with a data network 122 without a separate management network, but is otherwise the same as the system 100 of FIG. 1A. In the embodiment, management commands, monitored data, etc. are transmitted over the data network 122.

The management server 110, in some embodiments, is remote from the monitored system 150. In other embodiments, the management server 110 is collocated with the monitored system 150. The management server 110 is configured to manage some aspects of the monitored system 150, for example, to allow a system administrator to activate and deactivate network equipment, to configure network equipment, to send out software updates to the system equipment, to monitor the system equipment for failures, and the like.

The monitoring application 102 is configured to run on the management server 110 directly or over a virtual machine 104. In some embodiments, the monitoring application 104 monitors hardware parameters of hardware devices in the monitored system 150 to identify failures, to predict failures, to manage load sharing, and other operations to increase efficiency of operation of the monitored system 150. For example, the monitoring application 102 may be the XClarity™ Administrator by Lenovo® which is a centralized, resource-management solution that simplifies infrastructure management, speeds responses, and enhances the availability of Lenovo® server systems and solutions. The monitoring application may include other XClarity products and may include the XClarity Integrator, which may include offerings for VMware®, such as the VMware vRealize® Orchestrator™. The XClarity Administrator and similar products allow software plugins, such as hardware specific plugins discussed herein. The monitoring application 102 may include other branded monitoring products that allow hardware specific plugins. The monitoring application 102 specifically allows hardware specific plugins specific to specific hardware devices within the monitored system 150.

The management server 110 typically is connected to an electronic display 124 and other input devices such as a keyboard, mouse, etc. (not shown) to allow system administrator to access and operate the monitoring application 102 and other applications. In other embodiments, the management server 110 is accessible through a client device, which may be a separate computing device.

Typical monitoring applications are configured to monitor a wide variety of hardware devices, each of which include different monitored hardware parameters. In addition to the large number of hardware devices that many be monitored, each hardware device may come in a variety of models, versions, etc. Thus, typical monitoring applications must include many hardware monitoring capabilities that are often never used. The monitoring application 102 described herein is different than typical monitoring applications because the monitoring application 102 of the systems 100, 101 described herein allows hardware specific plugins, which are described in more detail below.

The management server 110 includes one or more processors 108 and includes memory 106 utilized by the processors 108. The memory 106 may include volatile memory and/or non-volatile memory. In addition, the management server 110 may include other equipment, such as graphical processing units, various busses, and other typical equipment of a computing device. The management server 110 may be a workstation, a desktop computer, a mainframe computer, a laptop computer, a tablet, a smartphone, or other device capable of running the monitoring application 102. In some embodiments, the management server 110 is a baseboard management computer ("BMC").

The management network 112 and/or data network 122 may include a wired network, a wireless connection, a fiber network, and the like and may include the Internet. The management network 112 and/or data network 122 include typical networking equipment, such as switches, routers, servers, cabling, and the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCglobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an Adaptive Network Technology ("ANT"®) and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The management network 112, in some embodiments, is a back channel network separate from the data network 122 that facilitates communication between the management server 110 and the various hardware devices of the monitored system 150. In some embodiments, the management network 112 conforms to the Redfish standards. In other embodiments, the management network 112 conforms to the Common Information Model ("CIM") standards. In other embodiments, the management network 112 conforms to the Intelligent Platform Management Interface ("IPMI") standard. The management server 110 may be a BMC or similar controller, which may connect to other management controllers distributed among different system modules that are often referred to as satellite controllers. Satellite controllers within the same chassis may connect to the BMC via a system interface called Intelligent Platform Management Bus/Bridge ("IPMB")—an enhanced implementation of I²C (Inter-Integrated Circuit). The management server 110 may connect to other satellite controllers or another BMC in another chassis via the Intelligent Platform Management Controller ("IPMC") bus or bridge, which may be managed with the Remote Management Control Protocol ("RMCP"), a specialized wire protocol defined by this specification. RMCP+ (a user datagram protocol ("UDP")-based protocol with stronger authentication than RMCP) may be used for IPMI over local area network. The management network 112 may be implemented using other management protocols and/or standards. One of skill in the art will recognize other management network types suitable for the systems 100, 101 described herein.

In other embodiments, such as depicted in FIG. 1B, the monitoring application 102 communicates with hardware of the monitored system 150 over a data network 122 used by the monitored system 150 for data transmission and may be referred to as a converged network. In such an environment, the monitoring application 102 may communicate using a particular protocol different than data transmission and a management network 112 may operate over the data network 122. For example, the management network may use UDP while the data network may include transmission control protocol ("TCP"). One of skill in the art will recognize other ways to implement the management network 112 in conjunction with a data network 122 for facilitating communication between a management server 110 and a monitored system 150.

The monitored system 150 includes various computing devices, such as servers 114, switches 116, routers (not shown), SAN servers 118, storage devices, 120, power supplies (not shown) and other computing equipment known to those of skill in the art. The computing devices may be rack mounted or free standing or both. The computing devices may be part of a cloud system, may be included in a system of a particular company or organization, etc. The monitored system 150, in some embodiments, accesses other resources, such as cloud computing services. The servers 114 may be rack mounted, may be workstations, desk top computers, mainframe computers, etc. For example, the servers 114 may be compute nodes of a Flex System Enterprise Chassis™ in a Lenovo Flex System™ that may include power supplies, fan modules, switches chassis management modules, information panels, storage devices, etc. —each of which may be monitored by the monitoring application 102. In some embodiments, the monitored system 150 includes leased equipment monitored remotely with the monitoring application 102. While the storage devices 120 are depicted as monitored by a SAN server 118, in other embodiments, the storage devices 120 are not part of a SAN, but are connected to one or more other servers 114 or computing devices. One of skill in the art will recognize other ways to configure and monitor a monitored system 150.

Figure 2:
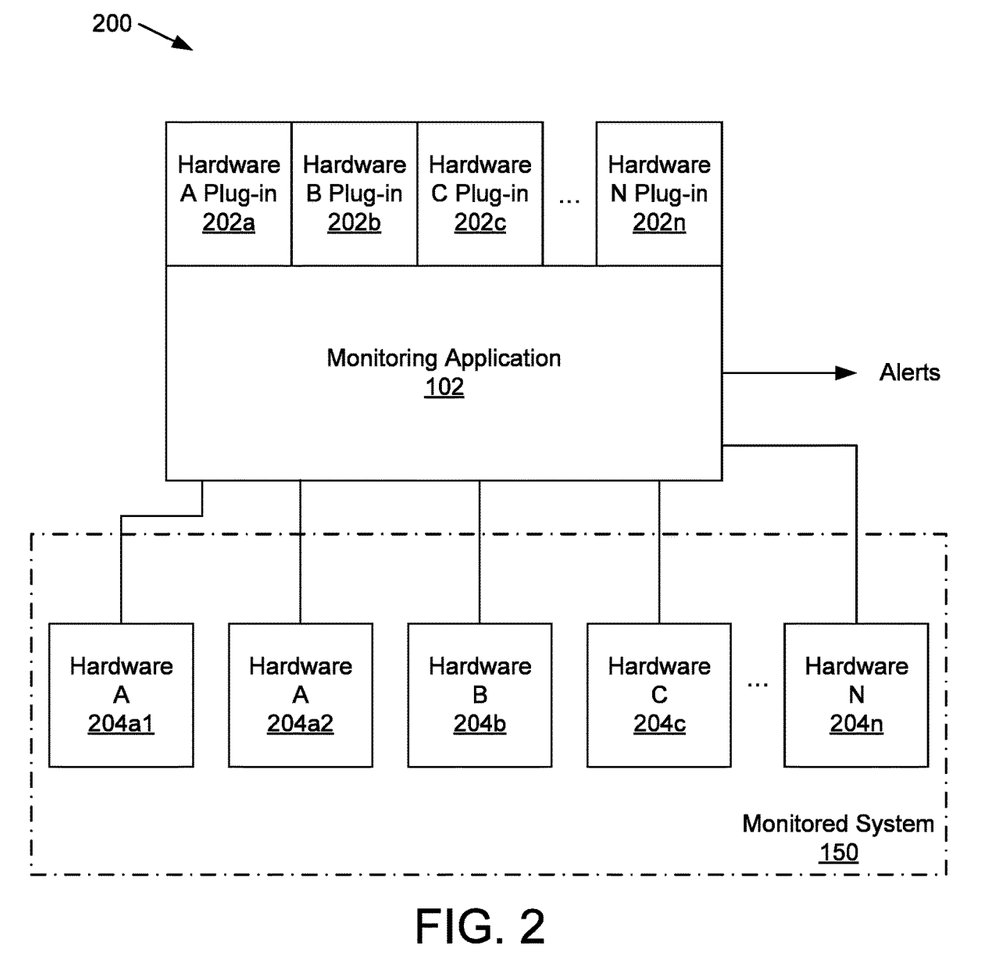
FIG. 2 is a schematic block diagram illustrating one embodiment of a monitoring application with hardware specific plugins.

FIG. 2 is a schematic block diagram illustrating one embodiment 200 of a monitoring application 102 with hardware specific plugins 202. The embodiment 200 includes the monitoring application 102 with multiple hardware specific plugins 202a, 202b, 202c, . . . 202n (generically or collectively "202") where the monitoring application 102 is connected to two instances of hardware A 204a1, 204a2, hardware B 204b, hardware C 204c, . . . hardware N 204n (generically or collectively "204"). The hardware device 204 are part of the monitored system 150. The monitoring application 102 is depicted separately for convenience, but it is understood that the monitoring application 102 and hardware specific plugins 202 run on a management server 110 or similar device, which includes a network interface card ("NIC"), busses, etc. to connect to the hardware devices 204. The monitoring application 102 outputs alerts for use by a network administrator, the management server 110 or other equipment to allow for maintenance and/or repair of hardware device 204 of the monitored system 150.

In one embodiment, a hardware specific plugin 202 is section of executable code that integrates with the monitoring application 102 once installed. The hardware specific plugin 202 includes analytics rules specific to particular monitored hardware parameters of a monitored hardware device 204 of the monitored system 150. In some embodiments, the hardware specific plugin 202 is an application programming interface ("API") that integrates with the monitoring application 104 using an interface compatible with the monitoring application 104. Each hardware specific plugin 202 is adapted to a particular hardware device 204 so that data from monitored hardware parameters of a hardware device 204 correspond to analytics rules of the corresponding hardware specific plugin 202. For example, one hardware device (e.g. 204b) may monitor six hardware parameters of various types and the corresponding hardware specific plugin 202b has one or more analytics rules that involve each of the six monitored hardware parameters. In some embodiments there is a one-to-one correspondence between analytics rules and monitored hardware parameters. In other embodiments, analytics rules may incorporate two or more monitored hardware parameters and/or may incorporate outputs of other analytics rules. Some analytics rules may be directed toward failures while other analytics rules may be directed toward failure predictions. Other analytics rules may be directed toward load management. One of skill in the art will recognize other analytics rules corresponding to monitored hardware parameters.

Each hardware device 204 of the monitored system 150 may include a hardware specific plugin 202, which allows the monitoring application 102 to implement specific analytics rules associated with monitored hardware parameters. Note that some hardware devices in the monitored system 150 may not be monitored or may have hardware parameters available for monitoring, but a system administrator may choose to not monitor the hardware parameters. Where a hardware device 204 is monitored, each piece of monitored hardware device 204 includes a specific plugin 202.

In the embodiment, there are two instances of hardware A 204a1, 204a2. In the embodiment, each instance of hardware A 204a1, 204a2 has the same monitored parameters. In one embodiment, a single hardware A hardware specific plugin 202a is used for both instances of hardware A 204a1, 204a2. In another embodiment, each instances of hardware A 204a1, 204a2 includes a separate hardware A plugin.

The monitored hardware parameters of a hardware device 204 include various measurements, interrupts, counter outputs, and any other parameter output by a hardware device 204. For example, the hardware parameters may include various temperature measurements and/or temperature alerts, such as processor temperature, chassis temperature, power supply temperature, storage device temperature, and the like. Other examples of monitored parameters include fan speed, processor load, humidity, storage device operations, etc. Monitored parameters may include CPU parameters, such as total operations, total operating time, operating cycles, or other parameter that may indicate a life cycle of a processor.

Other monitored parameters may include power usage of various components, load level of various components, and the like. Other monitored parameters may include various messages from a hardware device 204, such as hardware interrupts, hardware failures, error messages, and the like. The monitored parameters include any measurement, message, operating level, etc. that may be exported from a hardware device 204 for monitoring health and welfare of the hardware device 204. One of skill in the art will recognize other monitored parameters of a hardware device 204.

The hardware specific plugins 202 include analytics rules for various monitored parameters of a corresponding hardware device 204. For example, a hardware specific plugin (e.g. hardware plugin B 202b) may include an analytics rule regarding a power supply temperature of a corresponding hardware device (e.g. hardware B 204b). The analytics rule may include a simple threshold, such as a maximum temperature, or may include a more complex analytics rule, such as multi-level thresholds. In some embodiments, an analytics rule is dependent on multiple parameters, such as temperature and a power consumption. For example, a more complex analytics rule may include power supply temperature combined with power supply power consumption where an alert may be generated based on a particular combination of power supply temperature and power supply power output level. For instance, an analytics rule may generate an alert for a power supply temperature T1 at a 50% power output level of the power supply where the same temperature T1 may not generate an alert for a power supply at full load. Temperature T1 at the 50% power level may be indicative of a power supply problem where the same temperature T1 may be typical at full load.

In some embodiments, the analytics rules are mathematical equations and/or limits. In other embodiments, the analytics rules include information stored in a table, graph, chart, etc. In other embodiments, the analytics rules include software code that receives a software message, such as an error message, a hardware interrupt, a software error, a notification of a reboot, etc. and then issues an appropriate alert based on the analytics rule. For example, the analytics rule may detect a certain number of processor reboots, hardware interrupts, etc. and then issues an appropriate alert. In other examples, the analytics rules include one or more counters that count certain events before issuing an alert.

In various embodiments, the analytics rules include thresholds, limits, rates, etc. that may be set by a user. For example, the analytics rules may include temperature thresholds where a user is able to set the temperature thresholds. In other embodiments, the analytics rules include equations and the user is able to set values within the equation. In other embodiments, the analytics rules include a table where the user is able to set values in the table. One of skill in the art will recognize other thresholds, limits, factors, etc. of analytics rules that may be set by a user.

Figure 3:
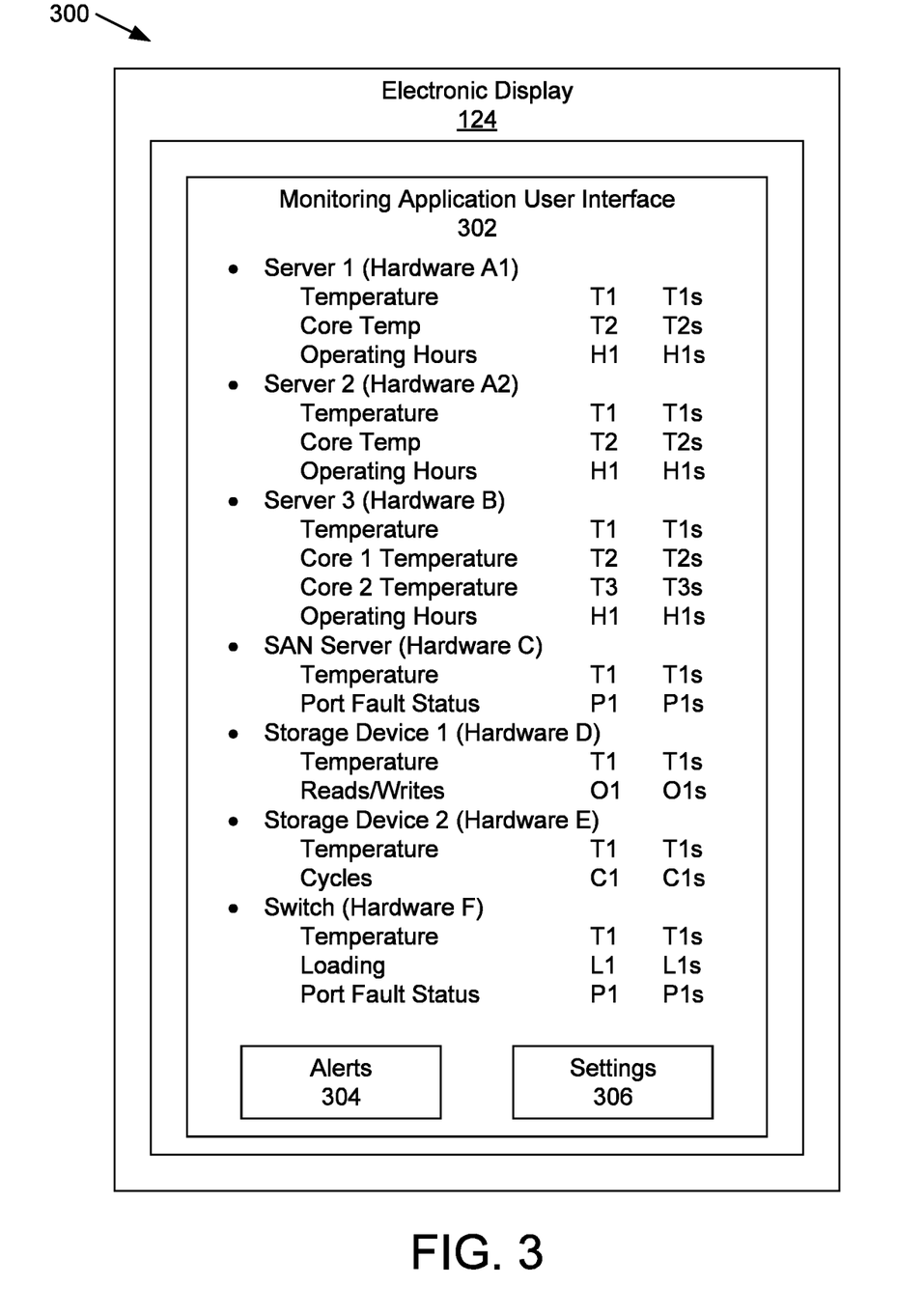
FIG. 3 is a schematic block diagram illustrating one embodiment of a graphic user interface displaying hardware parameters for monitored hardware.

FIG. 3 is a schematic block diagram illustrating one embodiment of a graphic user interface ("GUI") 300 displaying hardware parameters for monitored hardware. The GUI 300 includes a monitoring application user interface 302 displayed on an electronic display 124. The monitoring application user interface 302 includes various monitored parameters for each hardware device 204. The first hardware device A1 204a1 is server 1 114a and includes temperature T1, core temperature T2 and operating hours H1. For each hardware parameter of server 1 114a, there is a corresponding user setting (e.g. T1s, T2s, H1s for server 1 114a), which may be threshold. For example, a current reading of the temperature T1 for server 1 114a may be 75 degrees Celsius ("C") and a threshold T1s may be 100 degrees C. While a setting is indicated in the monitoring application user interface 302, some settings may be fixed or otherwise unavailable for change by a system administrator.

Note that server 1 114a and server 2 114b are identical (e.g. hardware A 204a1 and hardware B 204a2) so that the monitored parameters (e.g. T1, T2, H1) are the same, but there are separate instances for each server 114a, 114b. In the embodiment, a single hardware specific plugin 202a may be used for both servers 114a, 114b, but the monitoring application 102 creates separate instances of monitored parameters and corresponding user settings for each server 114a, 114b. In other embodiments, the monitoring application 102 includes two copies of hardware plugin A 202a.

The monitoring application user interface 302 may also include an alerts tab 304 or other means to adjust alerts generated by the monitoring application 102. For example, a user may access the alerts tab 304 to set up alert formats, alert types, to silence or clear an alert, etc. For instance, a user may have one alert type pop up on an electronic display, such as on a smartphone, while another alert type may be set up to be sent in an email, text, etc. Other alerts may be set up to take action, such as to automatically shut down a hardware device 204. One of skill in the art will recognize other ways that a user may set up alerts.

The monitoring application user interface 302 also includes a settings tab 306 that enables a user to adjust settings, such as the various limits for the hardware devices 204. For example, for server 1 the T1s threshold may be displayed but may not be changed until the settings tab 306 is selected. The monitoring application user interface 302, in other embodiments, includes other information, such as a system map, connections between hardware devices 204, graphs, charts, or other elements that facilitate monitoring and adjusting analytics rules and other monitoring functions of the monitoring application 102. One of skill in the art will recognize other ways to monitor, access and set up alerts, thresholds, and other customizable features of the monitoring application 102.

Figure 4:
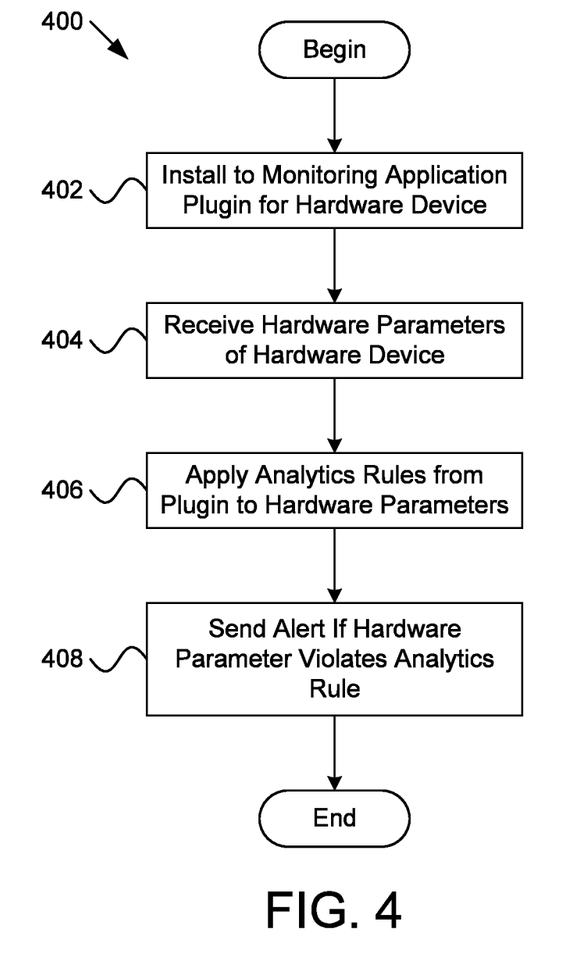
FIG. 4 is a schematic flow chart diagram illustrating one embodiment of a method for installing and using a hardware specific plugin.

FIG. 4 is a schematic block diagram illustrating one embodiment of a method 400 for installing and using a hardware specific plugin 202. The method 400 begins and installs 402 a hardware specific plugin 202 to a monitoring application 102 that monitors health of a monitored computing system 150. The hardware specific plugin (e.g. 202b, or generically 202) corresponds to a hardware device (e.g. 204b or generically 204) of the monitored system 150 monitored by the monitoring application 102. The hardware specific plugin 202 includes analytics rules corresponding to hardware parameters monitored within the hardware device 204 and received by a server, such as the management server 110, running the monitoring application 102. The method 400 receives 404 data corresponding to the hardware parameters of the hardware device 204 and applies 406 the analytics rules of the hardware specific plugin 202 to the received data of the monitored hardware parameters of the hardware device 204. The method 400 sends 408 an alert in response to determining that the received data violates an analytics rule of the hardware specific plugin 202, and the method 400 ends.

The method 400, in some embodiments, is embodied in executable code on computer readable storage media, such as in volatile or non-volatile the memory 106 or storage of the management server 110 and is configured to be executed by a processor 108 of the management server 110. In other embodiments, the method 400 is embodied in executable code on other computer readable storage media, such as a storage device, a flash drive, a compact disk, an optical disk, or the like, that is portable or on a computer system. In other embodiments, the method 400 is wholly or partially embodied on a programmable hardware device, such as field programmable gate arrays, programmable array logic, programmable logic devices or the like. In other embodiments, the method 400 is implemented at least partially with hardware circuits. For example, implementation of the method 400 may include hardware for receiving the data corresponding to the hardware parameters. One of skill in the art will recognize other ways to implement the method 400.

Figure 5:
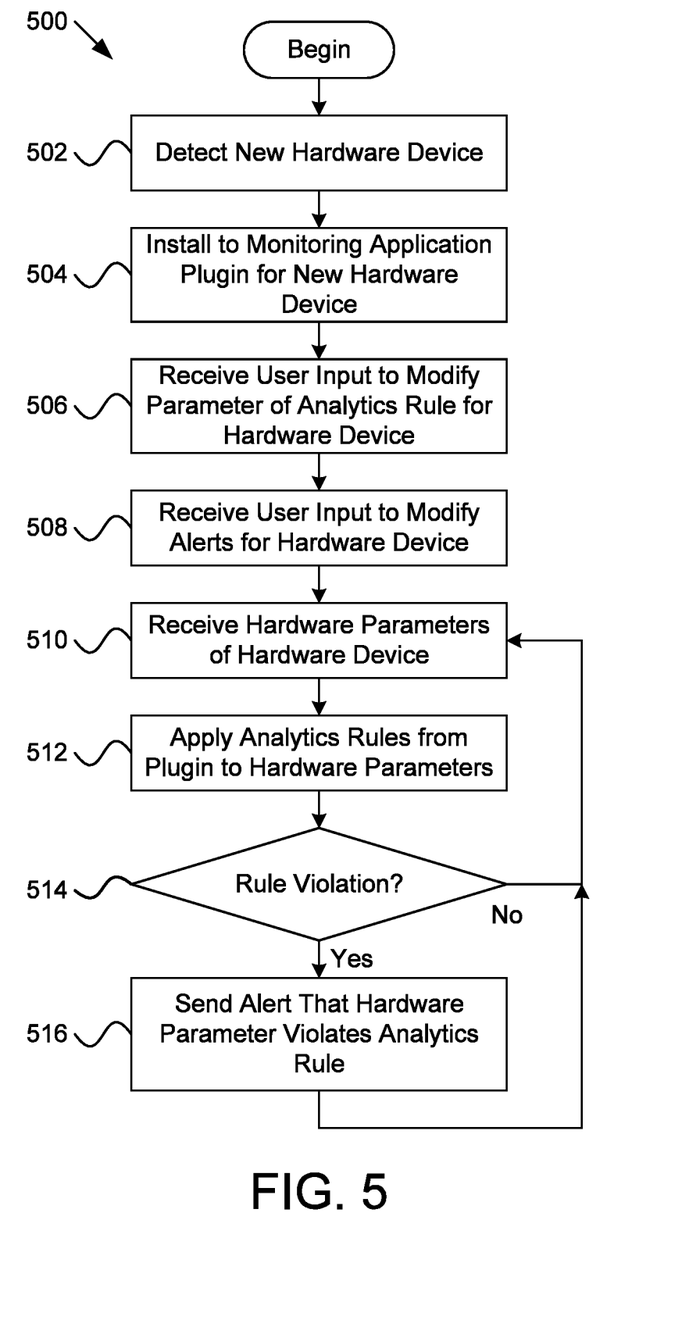
FIG. 5 is a schematic flow chart diagram illustrating one embodiment of another method for installing and using a hardware specific plugin.

FIG. 5 is a schematic flow chart diagram illustrating one embodiment of another method 500 for installing and using a hardware specific plugin 202. The method 500 begins and detects 502 a new connection to a hardware device (e.g. 204c or generically 204) of a monitored system 150. The connection enables receiving data corresponding to monitored parameters of the hardware device 204. The method 500 installs 504 a hardware specific plugin (e.g. 202c or generically 202), in response to detecting the new connection to the hardware device 204, to a monitoring application 102 that monitors health of a monitored computing system 150. In some embodiments, the monitoring application 102 runs on a management server 110 or similar device with a connection to the monitored system 150. In other embodiments, the monitoring application 102 runs on a virtual machine 104 of the management server 110. The hardware specific plugin 202 includes analytics rules corresponding to hardware parameters monitored within the hardware device 204 and received by a server, such as the management server 110, running the monitoring application 102.

The method 500 optionally receives 506 user input to modify one or more parameters of an analytics rule associated with a monitored hardware parameter of the hardware device 204. The analytics rule becomes available to the user via the installed hardware specific plugin 202. In some embodiments, the method 500 modifies a user interface 302 of the monitoring application 102 with the analytics rules of the hardware specific plugin 202 that correspond to the monitored hardware parameters of the hardware device 204. The user interface 302, in some embodiments, allows a user to view and modify parameters associated with analytics rules of hardware devices 204 monitored by the monitoring application 102. In some examples, the analytics rules in the hardware specific plugin 202 include one or more thresholds, limits, values, etc. for the monitored hardware parameters of the hardware device 204 and the user interface 302 enables the user to view the one or more thresholds, limits, values, etc. and to modify a threshold. In some embodiments, the analytics rules of a hardware specific plugin include default values and the user interface 302 allows a user to modify the default values.

In other embodiments, the user interface 302 enables the user to manage alert options for an alert associated with an analytics rule of the hardware specific plugin 202. The method 500 also optionally receives 508 user input to modify, set up, configure, etc. alerts for the monitored parameters of the hardware device 204 of the monitored system 150. For example, the user may input an alert type, such as an audible alert, an alert that pops up on a screen, an email, an alert that is an input to an application, etc. The received user input may include a network address for an alert destination, an email address to be notified, etc.

The method 500 receives 504 data corresponding to the hardware parameters of the hardware device 204. In some embodiments, the method 500 receives 504 data corresponding to the hardware parameters of the hardware device 204 by receiving the data over a network connection (e.g. 112, 122) to the hardware device 204. In some embodiments, the network connection is a management network 112 connection different from a data network 122 connecting components of the monitored computing system 150 for workload processing.

The method 500 applies 512 the analytics rules of the hardware specific plugin 202 to the received data of the monitored hardware parameters and determines 514 if there is a violation of an analytics rule of the hardware specific plugin 202. For example, the analytics rule may include a threshold and applying 512 the analytics rule includes determining data of a monitored hardware parameter exceeds the threshold. In other examples, the monitored data includes an event and the analytics rule includes a counter that counts the events and a count threshold and exceeding the count threshold is an analytics rule violation. In other embodiments, the method 500 determines 514 if there is an analytics rule violation by determining if a condition is met, if a particular message is received, etc.

If the method 500 determines 514 that there is a violation of an analytics rule, the method 500 sends 516 an alert and returns to receive 510 data corresponding to the monitored hardware parameters of the hardware device 204. If the method 500 determines 514 that there is not a violation of an analytics rule, the method 500 returns to receive 510 data corresponding to the monitored hardware parameters of the hardware device 204. The method 500 may be implemented in various ways as described in relation to the method 400 of FIG. 4.

Figure 6:
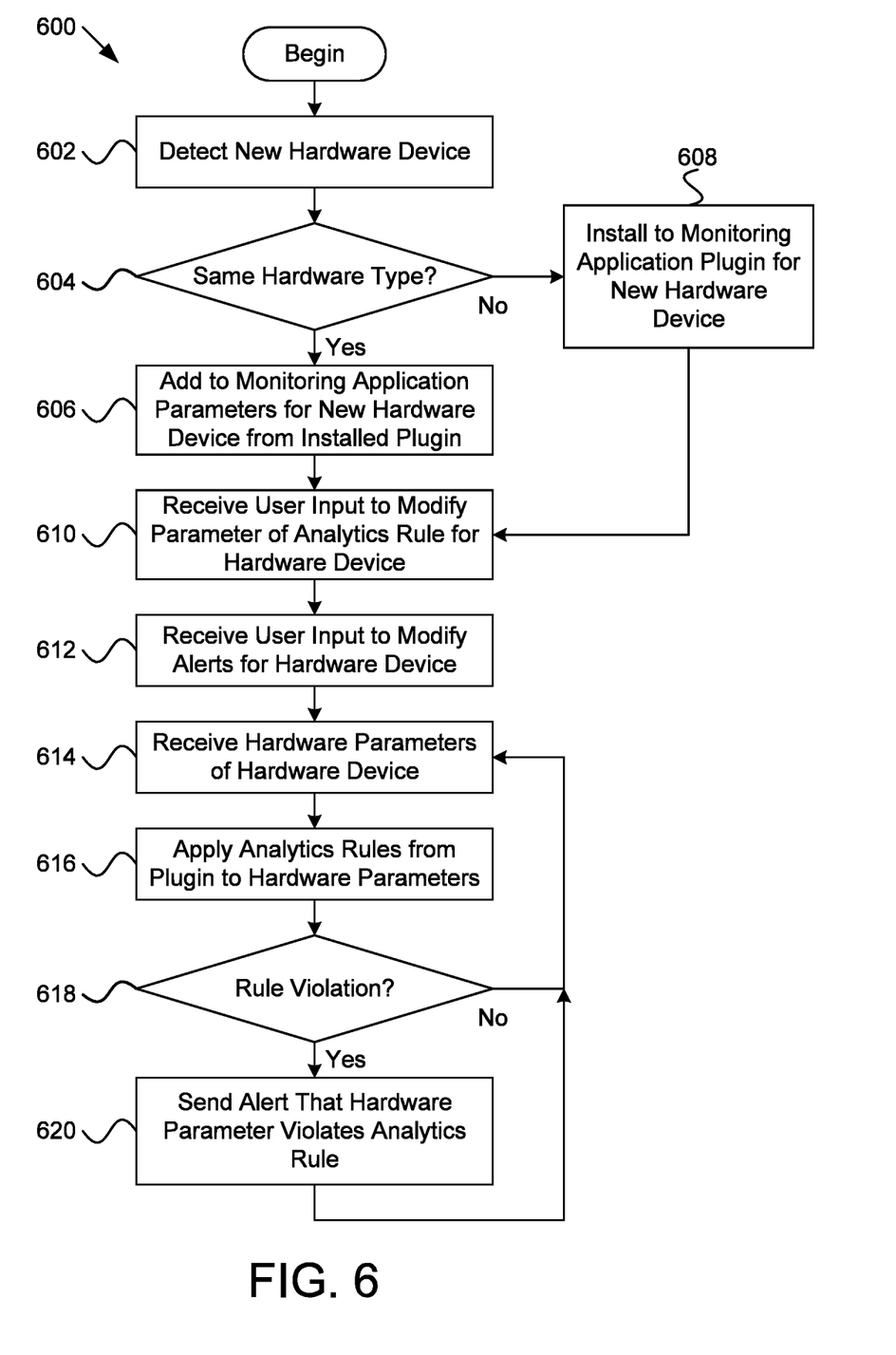
FIG. 6 is a schematic flow chart diagram illustrating one embodiment of a method for installing and using a hardware specific plugin where monitored hardware matches existing monitored hardware.

FIG. 6 is a schematic flow chart diagram illustrating one embodiment of a method 600 for installing and using a hardware specific plugin 202 where monitored hardware device 204a2 may match existing monitored hardware device 204a1. The method 600 begins and detects 602 detects 502 a new connection to a hardware device 204 of a monitored system 150. The connection enables receiving data corresponding to monitored parameters of the hardware device 204.

The method 600 determines 604 if the detected hardware device (e.g. 204a2) is the same as a hardware device (e.g. 204a1) already connected and being monitored in the monitored system 150. If the method 600 determines 604 that the new hardware device 204a2 is the same as a previously connected hardware device 204a1, the method 600 adds 606 to a monitoring application 102 monitoring hardware parameters of the monitored system 150 additional parameters that match those of the existing hardware device 204a1 from an existing hardware specific plugin 202a installed for the existing hardware device 204a1. If the method 600 determines 604 that the new hardware device (e.g. 204b) is different than a previously connected hardware device 204a1, the method 600 installs 608 a hardware specific plugin 202b that corresponds to the newly connected hardware device 204b.

As with the method 500 of FIG. 5, the method 600 optionally receives 610 user input to modify one or more parameters of analytics rules associated with monitored hardware parameters of hardware devices 204 of the monitored system 150 and/or optionally receives 612 user input to modify, set up, configure, etc. alerts for the monitored parameters of one or more hardware devices 204 of the monitored system 150. The method 600 receives 614 data corresponding to the hardware parameters of the hardware device 204 and applies 616 the analytics rules of the hardware specific plugin 202 to the received data of the monitored hardware parameters and determines 618 if there is a violation of an analytics rule of the hardware specific plugin 202.

If the method 600 determines 618 that there is a violation of an analytics rule, the method 600 sends 620 an alert and returns to receive 614 data corresponding to the monitored hardware parameters of the hardware device 204. If the method 600 determines 618 that there is not a violation of an analytics rule, the method 600 returns to receive 614 data corresponding to the monitored hardware parameters of the hardware device 204. The method 600 may be implemented in various ways as described in relation to the method 400 of FIG. 4.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

installing, by a management device, a hardware specific plugin to a monitoring application executing on the management device that monitors health of a monitored computing system, the hardware specific plugin corresponding to a hardware device of the monitored computing system monitored by the monitoring application over a back channel management network, the back channel management network comprising an internal network that is configured for transmitting data related to monitoring and management of hardware devices in the monitored computing system, wherein the hardware specific plugin comprises analytics rules that include algorithms that are specially adapted to monitor hardware parameters for specific hardware components of the hardware device, the analytics rues in the hardware specific plugin comprising one or more thresholds for the monitored hardware parameters of the hardware device;
receiving, by the management device over the back channel management network, data corresponding to the hardware parameters of the hardware device;
applying, by the management device, the analytics rules of the hardware specific plugin to the received data of the monitored hardware parameters of the hardware device;
sending, by the management device, an alert in response to determining that the received data violates an analytics rule of the hardware specific plugin;
detecting, by the management device, a new connection to a new hardware device that is the same as a previously connected hardware device;
receiving, by the management device, data corresponding to the hardware parameters of the new hardware device;
applying, by the management device, analytics rules of a hardware specific plugin previously installed for the previously connected hardware device to monitored hardware parameters of the new hardware device, wherein each monitored hardware parameter of the new hardware device comprises an additional monitored hardware parameter for the monitoring application; and
sending, by the management device, an alert in response to determining that the received data of the new hardware device violates an analytics rule of the hardware specific plugin,
wherein the monitored hardware parameters comprise temperature data, hardware failure data, power usage data, and/or hardware usage data.

2. The method of claim 1, further comprising receiving input from a user to modify one or more parameters of an analytics rule associated with a monitored hardware parameter of the hardware device, the analytics rule available to the user via the installed hardware specific plugin.

3. The method of claim 1, further comprising modifying a user interface to include parameters associated with the analytics rules of the hardware specific plugin that correspond to the monitored hardware parameters of the hardware device, wherein the user interface allows a user to view and modify parameters associated with analytics rules of hardware devices monitored by the monitoring application.

4. The method of claim 3, wherein the user interface enables the user to view the one or more thresholds and to modify a threshold.

5. The method of claim 3, wherein the user interface enables the user to manage alert options for an alert associated with an analytics rule of the hardware specific plugin.

6. The method of claim 1, further comprising detecting a new connection to the hardware device, the connection enabling receiving data corresponding to the monitored parameters of the hardware device, wherein installing the hardware specific plugin is in response to detecting the new connection to the hardware device.

7. The method of claim 1, wherein the back channel management network is different from a data network connecting components of the monitored computing system for workload processing.

8. The method of claim 1, wherein the hardware specific plugin comprises an analytics rule for each monitored hardware parameter of the hardware device.

9. The method of claim 1, wherein applying the analytics rules of the hardware specific plugin to the received data of the monitored hardware parameters comprises determining that a monitored hardware parameter exceeds a threshold and wherein sending an alert comprises sending an alert in response to the monitored hardware parameter exceeding the threshold, the alert identifying the exceeded threshold.

10. The method of claim 1, wherein the hardware specific plugin is an application data interface ("API") to the monitoring application.

11. The method of claim 1, wherein the monitoring application runs on a virtual machine running on the management device.

12. The method of claim 1, wherein at least one of the analytics rules is based on multiple monitored hardware parameters and the one or more thresholds for the monitored hardware parameters of the hardware device are associated with the multiple monitored hardware parameters.

13. A program product comprising a non-transitory computer readable storage medium having program code, the program code being configured to be executable by a processor to perform operations comprising:
installing, by a management device, a hardware specific plugin to a monitoring application executing on the management device that monitors health of a monitored computing system, the hardware specific plugin corresponding to a hardware device of the monitored computing system monitored by the monitoring application over a back channel management network, the back channel management network comprising an internal network that is configured for transmitting data related to monitoring and management of hardware devices in the monitored computing system, wherein the hardware specific plugin comprises analytics rules that include algorithms that are specially adapted to monitor hardware parameters for specific hardware components of the hardware device, the analytics rules in the hardware specific plugin comprising one or more thresholds for the monitored hardware parameters of the hardware device;
receiving, by the management device over the back channel management network, data corresponding to the hardware parameters of the hardware device;
applying, by the management device, the analytics rules of the hardware specific plugin to the received data of the monitored hardware parameters of the hardware device;
sending, by the management device, an alert in response to determining that the received data violates an analytics rule of the hardware specific plugin;
detecting, by the management device, a new connection to a new hardware device that is the same as a previously connected hardware device;
receiving data corresponding to the hardware parameters of the new hardware device;
applying, by the management device, analytics rules of a hardware specific plugin previously installed for the previously connected hardware device to monitored hardware parameters of the new hardware device, wherein each monitored hardware parameter of the new hardware device comprises an additional monitored hardware parameter for the monitoring application; and
sending, by the management device, an alert in response to determining that the received data of the new hardware device violates an analytics rule of the hardware specific plugin,
wherein the monitored hardware parameters comprise temperature data, hardware failure data, power usage data, and/or hardware usage data.

14. The program product of claim 13, the program code further configured to be executable by the processor to perform operations comprising receiving input from a user to modify one or more parameters of an analytics rule associated with a monitored hardware parameter of the hardware device, the analytics rule available to the user via the installed hardware specific plugin.

15. The program product of claim 13, the program code further configured to be executable by the processor to perform operations comprising modifying a user interface to include parameters associated with the analytics rules of the hardware specific plugin that correspond to the monitored hardware parameters of the hardware device, wherein the user interface avows a user to view and modify parameters associated with analytics rules of hardware devices monitored by the monitoring application.

16. The program product of claim 15, wherein the user interface enables the user to view the one or more thresholds and to modify a threshold.

17. A computing device comprising:
a processor; and
a memory that stores program code executable by the processor to:
install, by a management device, a hardware specific plugin to a monitoring application executing on the management device that monitors health of a monitored computing system, the hardware specific plugin corresponding to a hardware device of the monitored computing system monitored by the monitoring application over a back channel management network, the back channel management network comprising an internal network that is configured for transmitting data related to monitoring and management of hardware devices in the monitored computing system, wherein the hardware specific plugin comprises analytics rules that include algorithms that are specially adapted to monitor hardware parameters for specific hardware components of the hardware device, the analytics rules in the hardware specific plugin comprising one or more thresholds for the monitored hardware parameters of the hardware device;
receive, by the management device over the back channel management network, data corresponding to the hardware parameters of the hardware device;
apply, by the management device, the analytics rules of the hardware specific plugin to the received data of the monitored hardware parameters of the hardware device;
send, by the management device, an alert in response to determining that the received data violates an analytics rule of the hardware specific plugin;
detecting, by the management device, a new connection to a new hardware device that is the same as a previously connected hardware device;
receiving, by the management device, data corresponding to the hardware parameters of the new hardware device;
applying, by the management device, analytics rules of a hardware specific plugin previously installed for the previously connected hardware device to monitored hardware parameters of the new hardware device, wherein each monitored hardware parameter of the new hardware device comprises an additional monitored hardware parameter for the monitoring application; and
sending, by the management device, an alert in response to determining that the received data of the new hardware device violates an analytics rule of the hardware specific plugin,
wherein the monitored hardware parameters comprise temperature data, hardware failure data, power usage data, and/or hardware usage data.

* * * * *